(12) United States Patent
Gillespie

(10) Patent No.: US 7,887,015 B2
(45) Date of Patent: Feb. 15, 2011

(54) SURFACE MOUNTING SYSTEM

(75) Inventor: John Michael Gillespie, Green Oaks, IL (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

(21) Appl. No.: 12/471,055

(22) Filed: May 22, 2009

(65) Prior Publication Data
US 2010/0012801 A1 Jan. 21, 2010

Related U.S. Application Data

(60) Provisional application No. 61/081,819, filed on Jul. 18, 2008.

(51) Int. Cl.
A47B 96/06 (2006.01)
(52) U.S. Cl. .................................. 248/220.21; 248/917
(58) Field of Classification Search ............ 248/220.21, 248/220.22, 222.14, 224.8, 125.8, 121, 917; 108/50.01
See application file for complete search history.

(56) References Cited

U.S. PATENT DOCUMENTS

| | | | | |
|---|---|---|---|---|
| 3,324,254 | A | * | 6/1967 | Shaw et al. ................. 381/363 |
| 3,744,282 | A | * | 7/1973 | Hemphill ........................ 70/58 |
| 3,770,334 | A | * | 11/1973 | Weber ...................... 312/223.4 |
| 4,750,832 | A | | 6/1988 | Lloyd, Sr. et al. |
| 5,927,668 | A | | 7/1999 | Cyrell |
| 6,073,892 | A | | 6/2000 | Dittmer |
| 6,099,093 | A | * | 8/2000 | Spence ........................ 312/196 |
| 6,199,804 | B1 | * | 3/2001 | Donofrio, Jr. ................ 248/121 |
| 6,394,609 | B1 | | 5/2002 | Rodriguez, Jr. et al. |
| 6,394,610 | B2 | | 5/2002 | Rodriguez, Jr. |
| 6,485,146 | B2 | | 11/2002 | Rodriguez, Jr. |
| 6,540,366 | B2 | | 4/2003 | Keenan et al. |
| 6,604,829 | B2 | | 8/2003 | Rodriguez, Jr. |
| 6,915,995 | B2 | | 7/2005 | Gillespie |
| 6,935,883 | B2 | | 8/2005 | Oddsen, Jr. |
| 7,066,435 | B2 | | 6/2006 | Oddsen, Jr. et al. |
| 7,077,373 | B1 | | 7/2006 | Hoebener et al. |
| 7,090,182 | B2 | | 8/2006 | O'Neill |
| 7,229,057 | B2 | | 6/2007 | Cavell |

(Continued)

OTHER PUBLICATIONS

U.S. Appl. No. 29/322,954, filed Aug. 14, 2008, Gilllespie.

(Continued)

Primary Examiner—Ramon O Ramirez
(74) Attorney, Agent, or Firm—Foley & Lardner LLP

(57) ABSTRACT

An improved mounting system used to mount an audio/visual device, such as a flat panel display, to a desktop or other substantially horizontal mounting surface. According to various embodiments, a surface mounting system comprises a support assembly which mates with one or more collars positioned above and below the surface to which the mounting system is secured. The collars secure the rest of the mounting system to the desktop, and the collars may also secure other components which serve to prevent the support assembly from rotating in an undesirable manner. Only a single hole needs to be made in the desktop or other surface to which the system is mounted, while the number of components that are needed to attach the mounting system to the surface in a secure manner can be minimized. No locking agent is also need to properly and sufficiently secure the surface mounting system to the desktop.

20 Claims, 11 Drawing Sheets

U.S. PATENT DOCUMENTS

| | | | |
|---|---|---|---|
| 7,242,394 | B2 | 7/2007 | Lahade et al. |
| 7,271,964 | B2 | 9/2007 | Rodriguez, Jr. et al. |
| 7,320,454 | B2 | 1/2008 | Lee et al. |
| 7,334,762 | B2 | 2/2008 | Dittmer |
| 7,345,870 | B2 | 3/2008 | Shin |
| 7,380,760 | B2 | 6/2008 | Dittmer |
| 7,448,584 | B2 | 11/2008 | Chen et al. |
| 7,487,943 | B1 | 2/2009 | Gillespie |
| 2004/0026584 | A1 | 2/2004 | Libbey et al. |
| 2006/0060735 | A1 | 3/2006 | Oddsen, Jr. et al. |
| 2007/0109734 | A1* | 5/2007 | Chen et al. .................. 361/681 |
| 2007/0279850 | A1* | 12/2007 | Chiang et al. ............... 361/681 |
| 2007/0285624 | A1 | 12/2007 | Rodriguez, Jr. et al. |
| 2008/0029661 | A1 | 2/2008 | Chen |
| 2008/0137040 | A1 | 6/2008 | Rodriguez et al. |
| 2008/0165137 | A1 | 7/2008 | Lahade et al. |

OTHER PUBLICATIONS

"Presentation Media Online Shop, LCD Projectors > Short Throw" http://www.presentationmedla.co.uk.acatalog/Close_Range_Projection.html; Apr. 22, 2008; 10 pages.

"Presentation Media Online Shop, Height Adjustable Towers & Trolleys," http://www.presentationmedia.co.uk/acataolg/Whiteboard.html; Apr. 22, 2008; 14 pages.

"Presentation Media Online Shop, Fixtures & Fixings > Whiteboard Brackets" http://www.presentationmedia.co.uk/acataolg/Whiteboard_brackets.html; Apr. 22, 2008; 3 pages.

"SMART Board 600i interactive whiteboard system," http://www2.smarttech.com/st/en-US/Products/SMART+Boards/Front+Projection /600i+Series/default.htm; Apr. 22, 2008; 2 pages.

PolyVision® A Steelcase Company, "Interactive Whiteboards now with 3M's Super Close Projection Technology!", PolyVision Corporation, 1 page.

3M™ Digital Media Systems 800 | 810 | 815, 2007, 2 pages.

3M™ Digital Wall Display 9000PD Plus, 2007, 2 pages.

Introducing . . . The 3M™ A Digital Wall Display Plus Series, 9000PD Plus | 9200IW Plus, 2007, 4 pages.

Introducing . . . The 3M™ Digital Media System 800 Series Featuring Vikuiti™ Super Close Projection, Digital Media System 800 | 815, 2006, 4 pages.

3M Projection Systems, 3M™ Super Close Projection System SCP712, 2008, 4 pages.

Projector Wall Fixings, Presentation Media Online Shop, 3 pages.

Whiteboard Brackets, Height Adjustable Towers & Trolleys, Presentation Media Online Shop.

"Promethean Lighting the Flame of Learning", Activeboard+2 Video Overview, Video: ActivBoard+2: Activclassroom: Education Solutions: Promethean USA, Promethean Worldwide, http://www.prometheanworld.com/us/server/show/nav.2504, 2 pages.

* cited by examiner

SURFACE MOUNTING SYSTEM

CROSS REFERENCE TO RELATED PATENT APPLICATIONS

The present application claims priority to U.S. Provisional Patent Application No. 61/081,819, filed Jul. 18, 2008, and the contents of which are incorporated herein by reference in their entirety.

FIELD OF THE INVENTION

The present invention relates generally to mounting systems. More particularly, the present invention relates to mounting systems for audio/visual equipment such as flat panel displays.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display ("LCD") flat panel displays have continued to fall, and the quality for the same devices have improved, more and more businesses and individuals have purchased such devices for both home and business purposes.

In the case of some flat panel displays (particularly smaller displays), many users have desired to securely mount such displays to a desktop or other substantially flat, substantially horizontal surface. Although there are a number of desktop mounting systems conventionally available, many of these mounts literally rest on top of the desk or other surface, meaning that it is not difficult for the mount (and therefore the display) to be accidentally bumped and thereby damaged. Additionally, this type of desktop mount is often not capable of supporting displays which are relatively large in size.

Other desktop mounts that are conventionally available attempt to address the above issues by being physically connected to the desktop or other surface. In particular, a number of desktop mounts are properly installed by having a user drill a plurality of holes into the desktop, and these holes are used to secure the mount to the desktop. Although such arrangements help to prevent the mount and display from falling over and being damaged, these mounting systems also require that the user physically damage the desktop or other surface by drilling a plurality of holes into it.

SUMMARY OF THE INVENTION

Various embodiments provide for an improved mounting system used to mount an audio/visual device, such as a flat panel display, to a desktop or other substantially horizontal mounting surface. According to various embodiments, a surface mounting system comprises a support assembly which mates with one or more collars that are positioned above and below the surface to which the mounting system is secured. The collars secure the rest of the mounting system to the desktop, and the collars may also secure other components which serve to prevent the support assembly from rotating in an undesirable manner. With this arrangement, only a single hole needs to be made in the desktop or other surface to which the system is mounted, while the number of components that are needed to attach the mounting system to the surface in a secure manner can be minimized. No locking agent is needed to properly and sufficiently secure the surface mounting system to the desktop.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
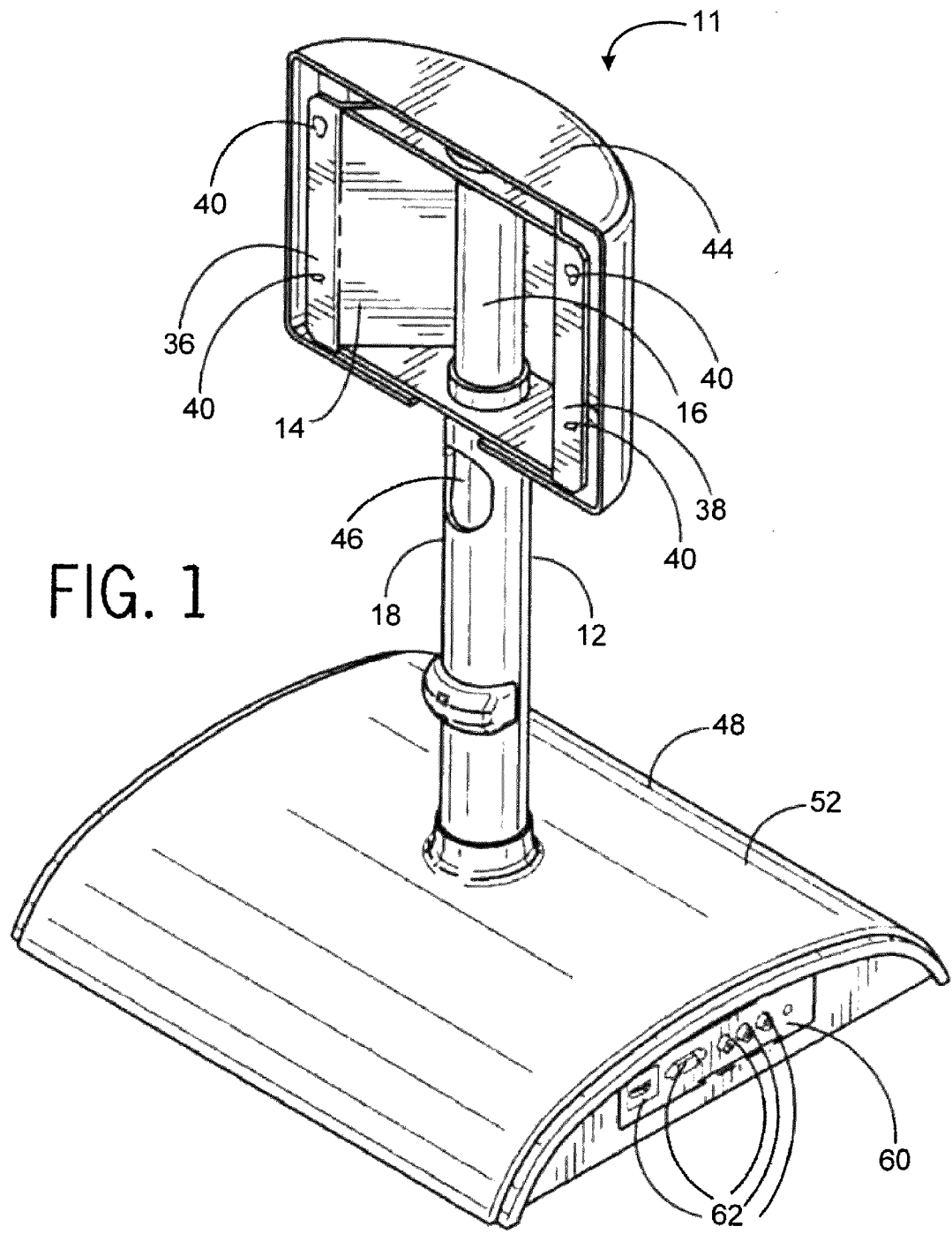
FIG. 1 is a perspective view of a surface mounting system constructed according to various embodiments of the present invention, with the surface mounting system not attached to a surface.
Figure 2:
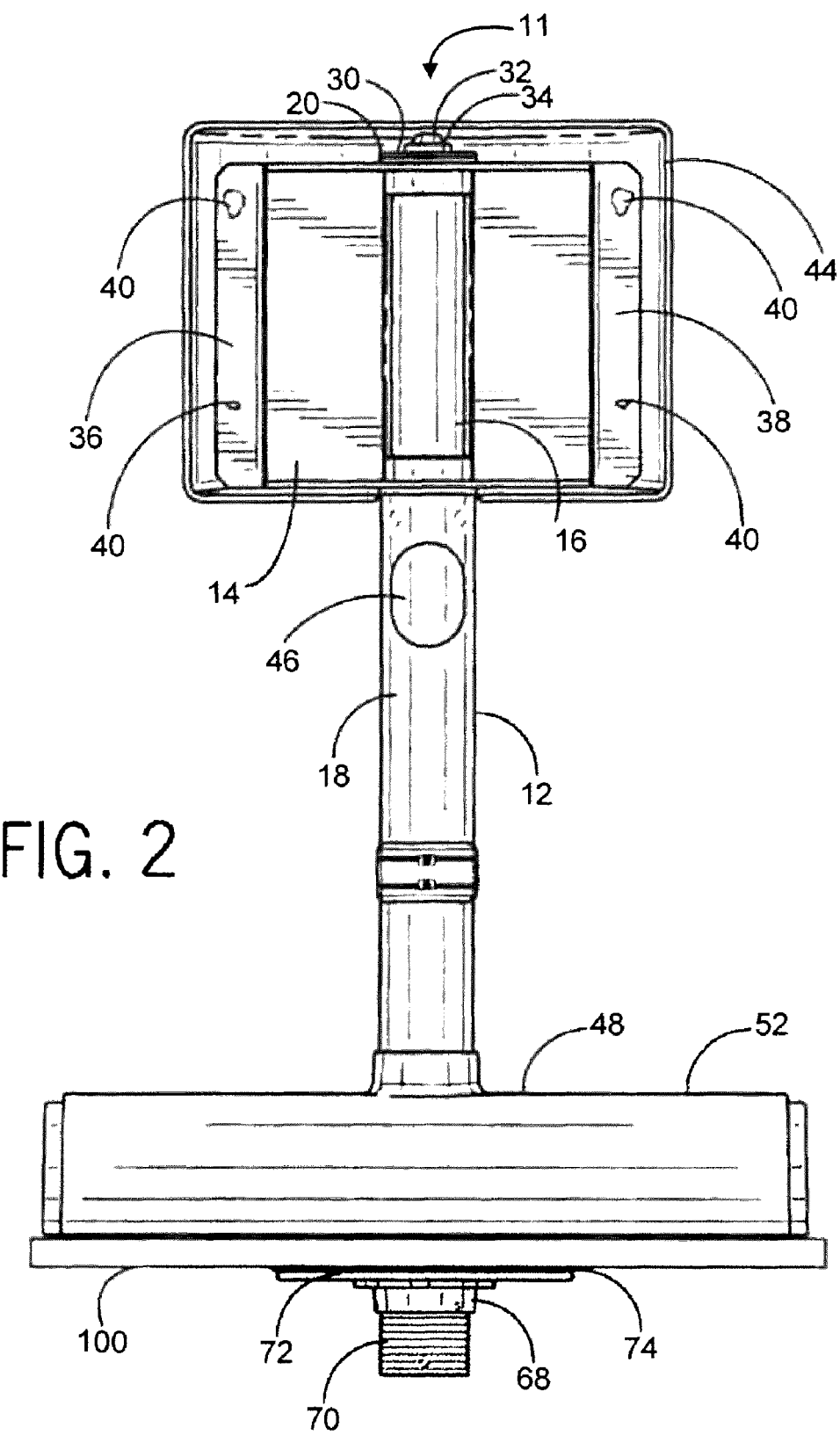
FIG. 2 is a front view of the surface mounting system of FIG. 1, also showing the surface to which the surface mounting system is mounted.
Figure 3:
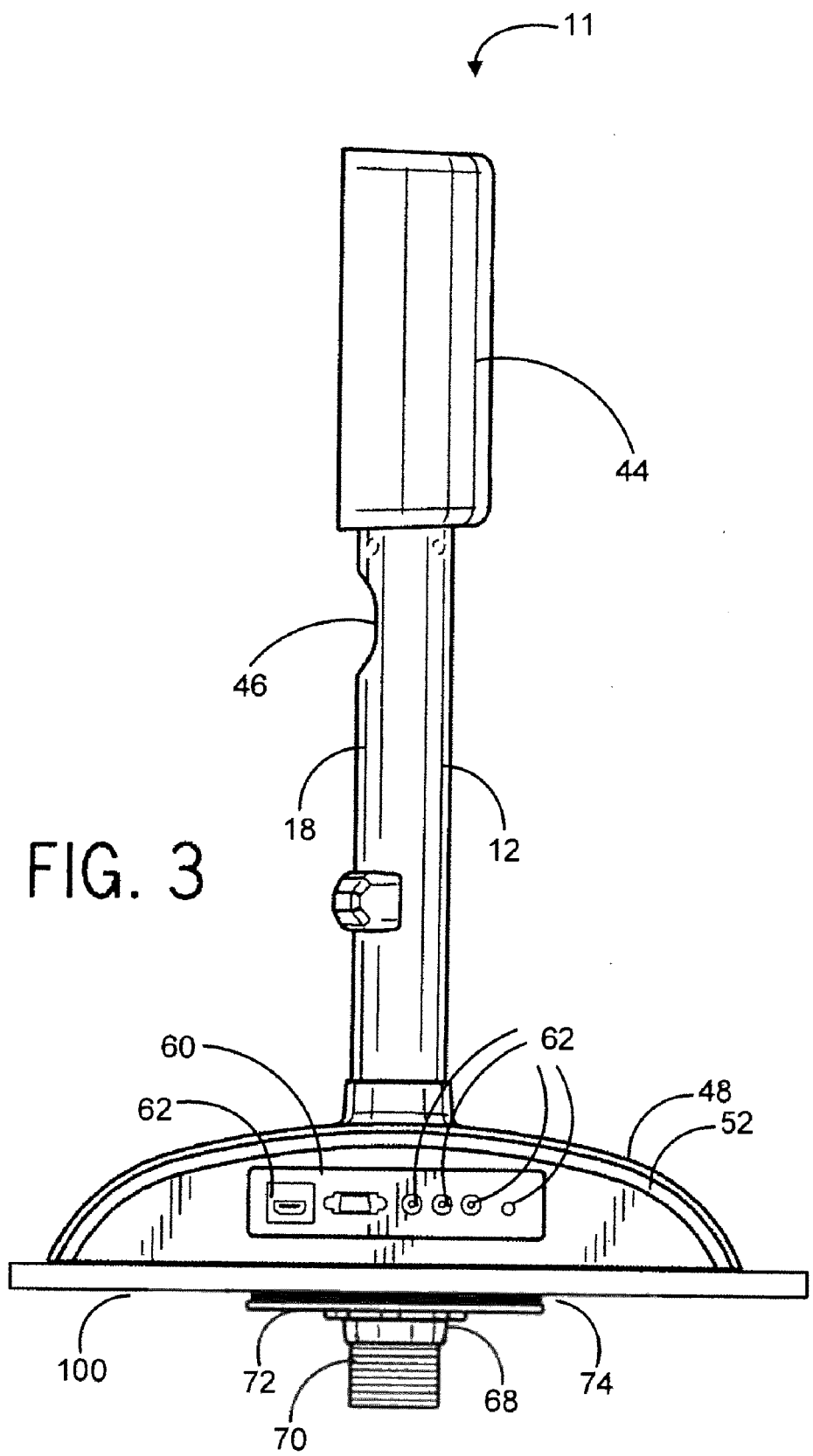
FIG. 3 is a right side view of the surface mounting system of FIG. 1, also showing the surface to which the surface mounting system is mounted.
Figure 7:
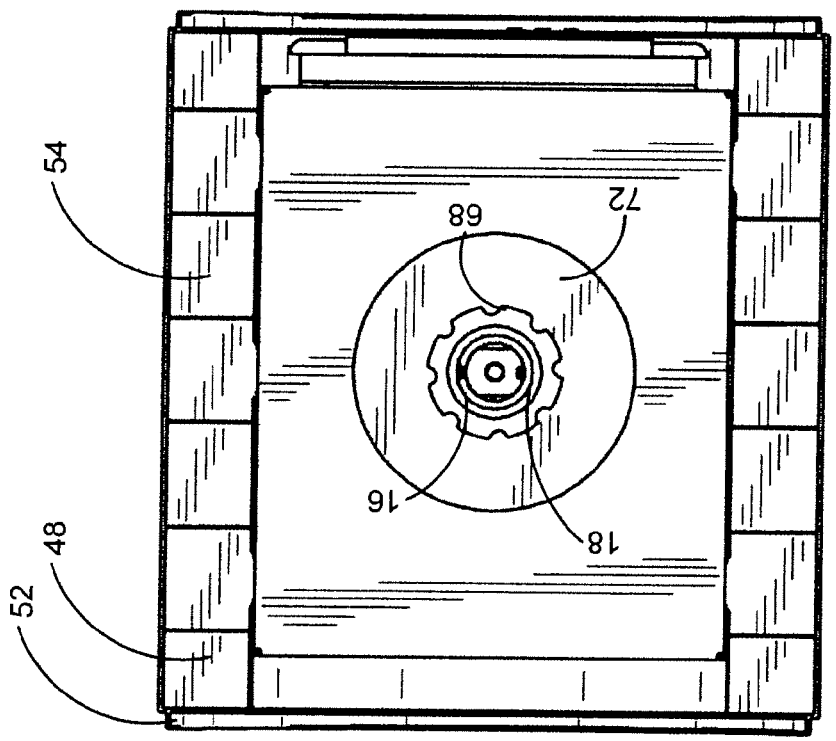
FIG. 7 is a bottom view of the surface mounting system of FIG. 1.
Figure 4:
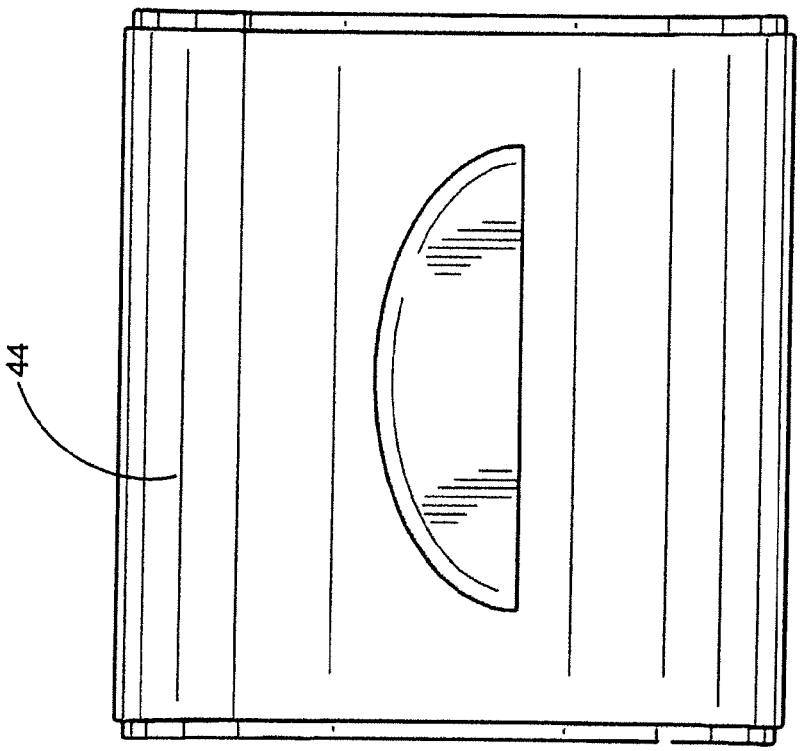
FIG. 4 is a top view of the surface mounting system of FIG. 1.
Figure 5:
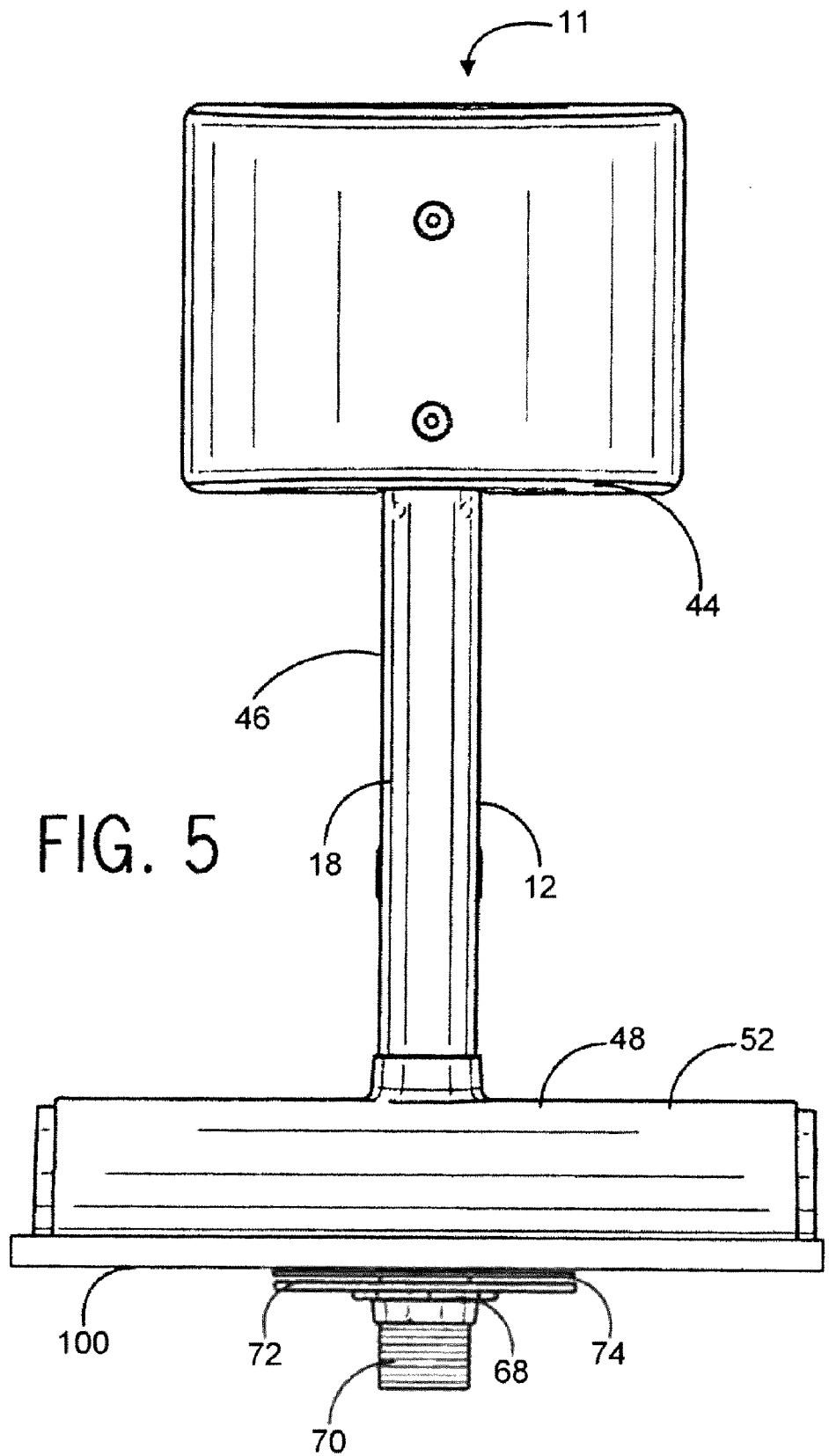
FIG. 5 is a rear view of the surface mounting system of FIG. 1.
Figure 6:
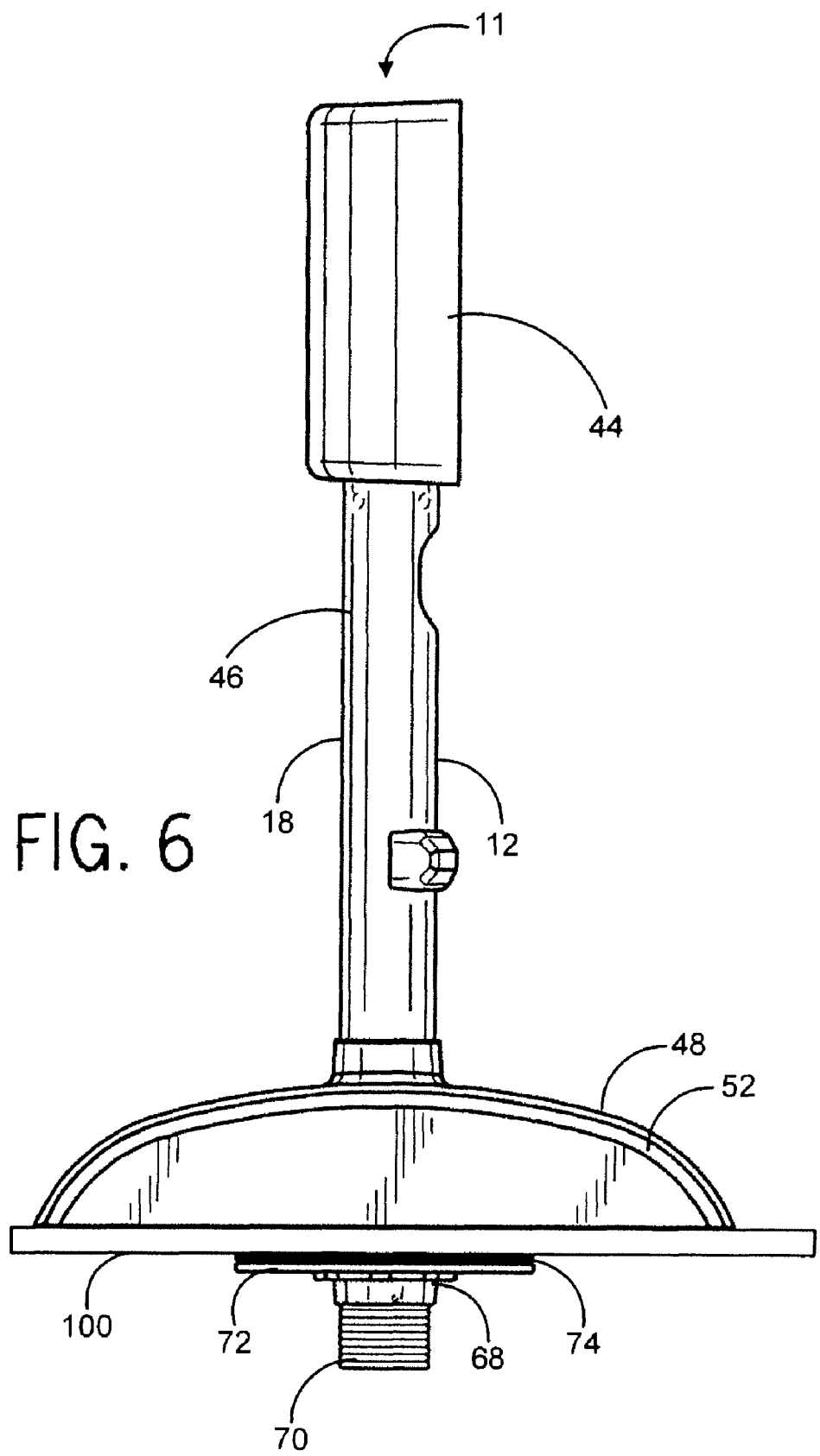
FIG. 6 is a left side view of the surface mounting system of FIG. 1.
Figure 8:
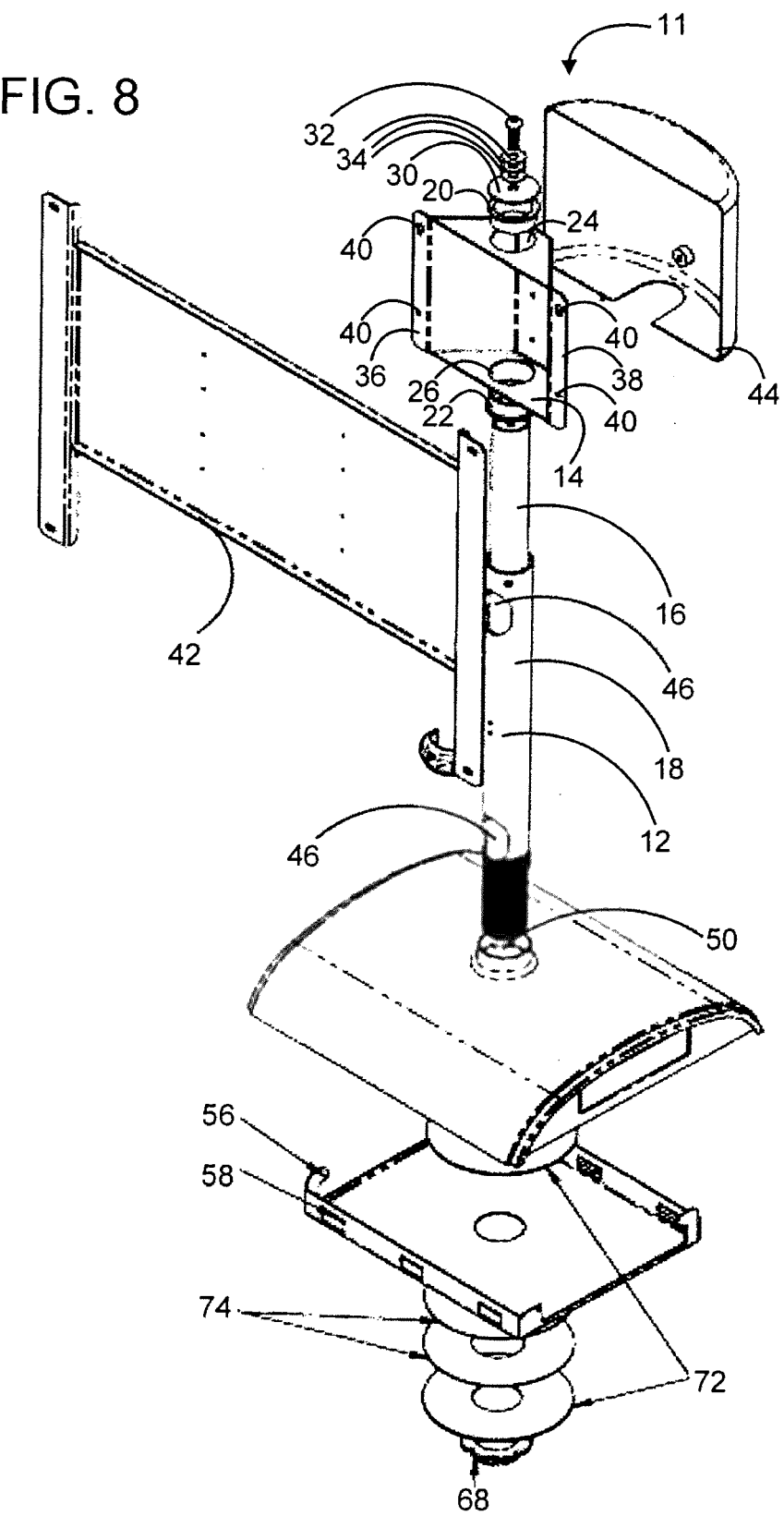
FIG. 8 is an exploded perspective view of the surface mounting system of FIG. 1, with the inclusion of an adapter bracket and the removal of the multimedia interface.
Figure 9:
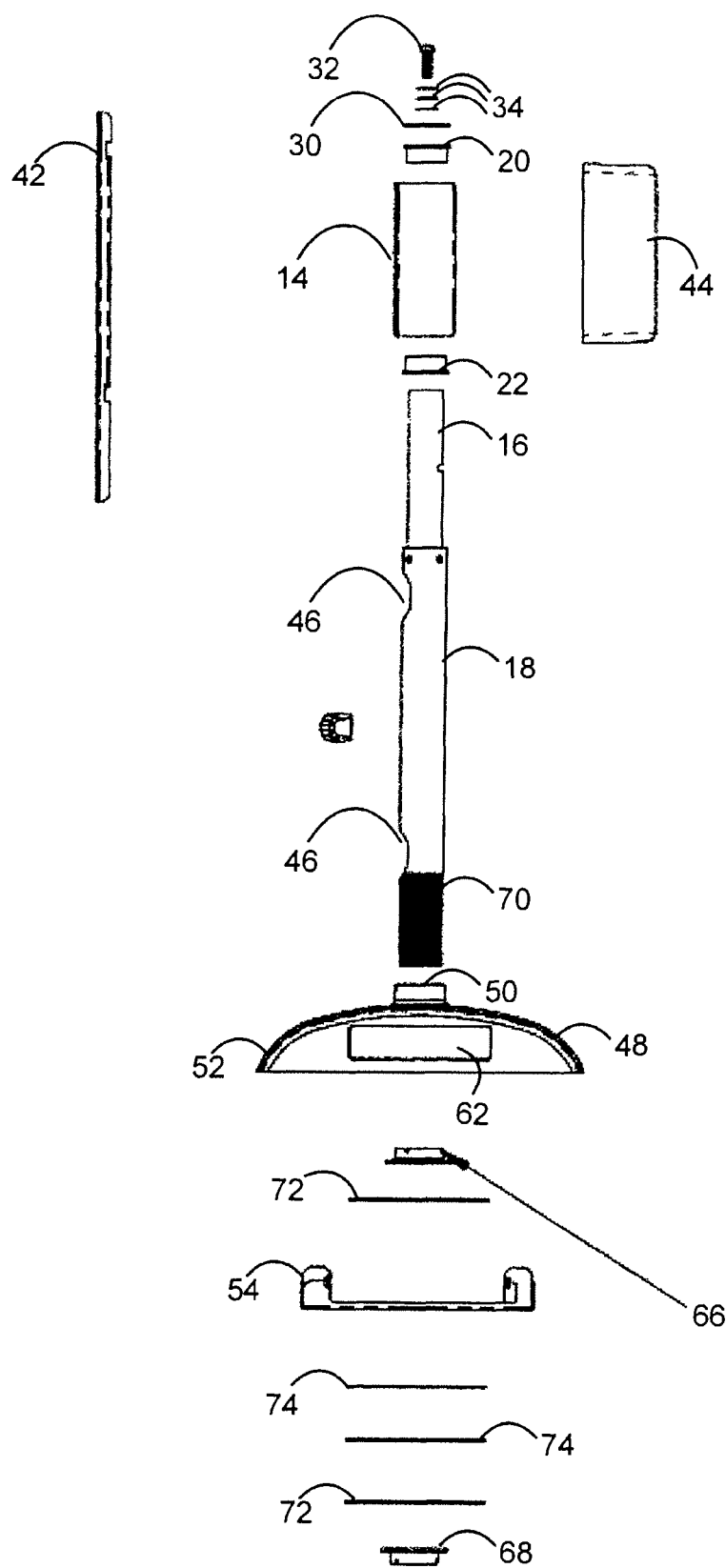
FIG. 9 is an exploded right side view of the mounting system of FIG. 8.

FIGS. 1-9 depict a surface mounting system 11 constructed according to various embodiments. The surface mounting system 11 comprises a support assembly 12 operatively connected to a device bracket 14. As best shown in FIGS. 8 and 9, the support assembly 12 may comprise an upper support member 16 and an lower support member 18. The upper support member is connected to the device bracket 14 and is operatively connected to the lower support member, which is secured to a desktop 100 or other surface. In one particular embodiment, the upper support member 16 is welded or otherwise securely fastened to the lower support member 18.

As best shown in FIGS. 8 and 9, an upper device collar 20 and a lower device collar 22 are used to connect the upper support member 16 to the device bracket 14. The device bracket 14 includes an upper device opening 24 and a lower device opening 26, both of which are sized to accept the upper support member 16. The upper device opening 24 also accepts a portion of the upper device collar 20, while the lower device opening 26 accepts a portion of the lower device collar 22. When the surface mounting system 11 is in an assembled position, the upper support member 16 passes through the upper and lower device openings 24 and 26, as well as the upper and lower device collars 20 and 22, which are partially positioned within the upper and lower device openings 24 and 26, respectively. A device contact member 30 rests on top of the upper device opening 24, and a fastener 32 (in the form of a screw in FIGS. 8 and 9) passes through the device contact member 30, the upper device opening 24 and the upper support member 16 in order to secure the device bracket 14 to the upper support member 16. In one embodiment, this arrangement permits the device bracket 14 and attached components to rotate relative to the upper support member 16, thereby enabling the user to orient the device bracket 14 in a preferred viewing position. In one embodiment, the device contact member 30 is disk-shaped, although the device contact member 30 may possess other shapes as well. One or more washers 34 may also be used in this fastening process.

Figure 11A:
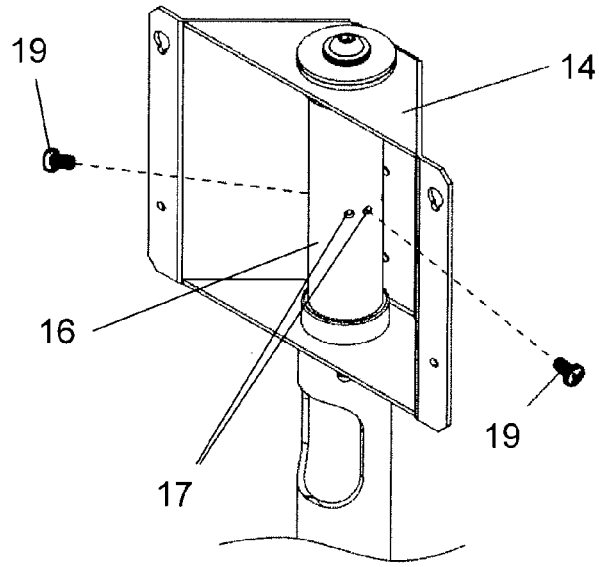
FIG. 11(a) is a front perspective view of a portion of a surface mounting system according to one particular embodiment.
Figure 11B:
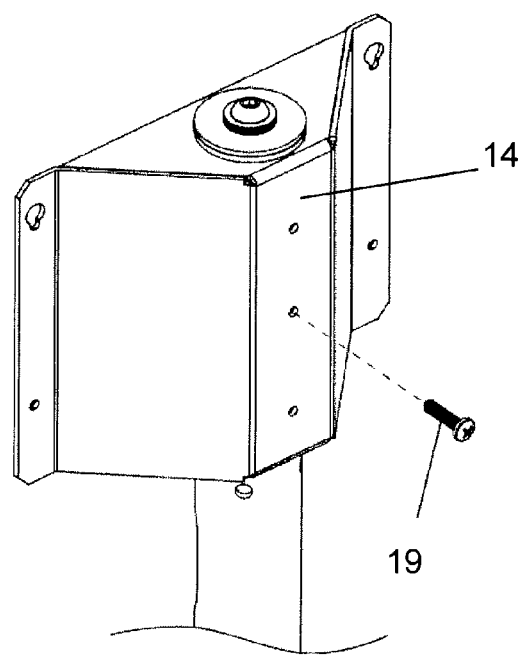
FIG. 11(b) is a rear perspective view of the surface mounting system of FIG. 11(a)
Figure 11C:
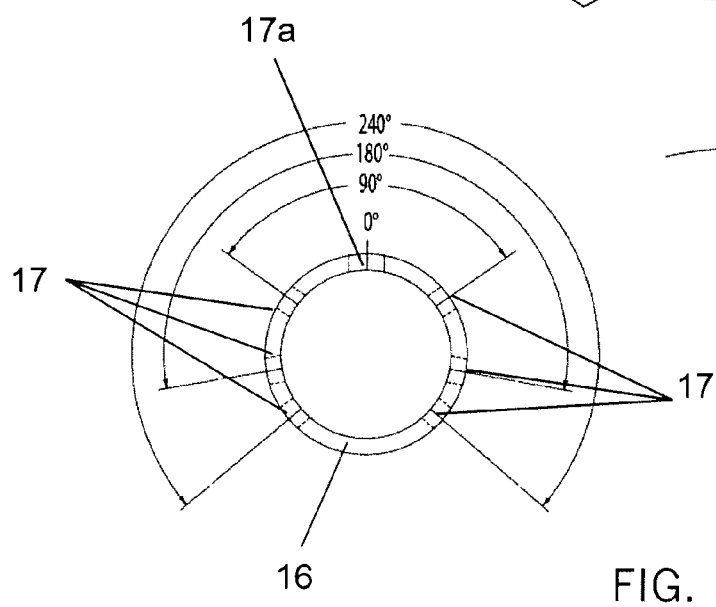
FIG. 11(c) is a cross-sectional view through the upper support member of the surface mounting system of FIG. 11(a).

In one embodiment, the range of rotation of the device bracket 14 about the upper support member 16 may be optionally and selectively configurable. By way of non-limiting example, and as depicted in FIGS. 11(a)-11(c), one or more openings 17 may be circumferentially disposed about a portion of the upper support member 16 and configured to optionally receive a portion of a connecting element 19, as seen in a particular embodiment. The connecting element 19 may extend from the surface of the upper support member 16 and impinge on the device bracket 14 when the device bracket 14 is rotated about the upper support member 16 beyond a predetermined limit, thereby establishing a range of rotation for the support bracket 14. As shown in FIG. 11(c), the one or more openings 17 may be orientated about the upper support member 16 to provide a plurality of optionally selectable rotational ranges for the device bracket 14, for example, about 90°, about 180° and about 240°. However, the openings 17 may be arranged in other configurations to provide, additional, fewer or different ranges. In practice, a pair of the connecting elements 19 are inserted in two of the one or more openings 17 to provide the desired range of rotation. Of course, additional ranges can also be achieved by using a single connecting element 19. As seen in FIGS. 11(b) and 11(c), an opening 17a may also be provided in the upper support member 16 to align with a rear portion of the device bracket 14. By insertion of a connecting element 19 through the device bracket 14 and the opening 17a, rotation of the device bracket 14 may be substantially prevented. Of course, a connecting element 19 need not be inserted into any of the one or more openings 17 or 17a, thereby not limiting the range of rotation of the device bracket 14 in various embodiments.

The device bracket 14 depicted in FIGS. 1-9 includes a first connecting flange 36 and a second connecting flange 38. Each of the first and second connecting flanges 36 and 38 includes one or more flange openings 40 for use in securing the device bracket 14 to a display device (not shown) using various types of fasteners. The flange openings 40 may take a variety of shapes, sizes and configurations. In the event that a relatively large display device is to be secured to the surface mounting system 11, an adapter bracket 42 may be secured to the device bracket 14 via the first and second connecting flanges 36 and 38. In this arrangement, the display device is attached to the adapter bracket 42 instead of the first and second connecting flanges 36 and 38.

A device bracket cover 44 may be removably or nonremovably positioned around a portion of the device bracket 14. The device bracket cover 44, which may be formed of a wide variety of materials such as plastic, may be secured to the device bracket 14 using fasteners such as screws, or it may be snap-fit to the device bracket 14 or connected to the device bracket 14 by other known mechanisms.

As shown in FIGS. 1-3 and 8-9, for example, the lower support member 18 may include one or more cord acceptance openings 46 therein to permit certain cord management operations. Similar openings may also be included in the upper support member 16. When a display device is mounted on the device bracket 14, the device's power cords, audio and video cables, etc. can pass through the cord acceptance openings 46 and run through the lower support member 18 and the upper support member 16 to the underside of the surface or to the inside of a base 48 of the surface mounting system 11. This arrangement reduces the clutter above the surface, effectively hiding a significant length of the cables and cords from view.

The lower support member 18 is sized and configured to be received by the base 48 through a base opening 50. The base 48 may be substantially hollow and is configured to rest on a desktop 100 or other substantially flat surface. The base 48 comprises a base upper portion 52 and a base lower portion 54. In various embodiments, the base lower portion 54 snap fits with the base upper portion 52. The snap fitting of the base lower portion 54 with the base upper portion 52 may be accomplished in a variety of manners, including using hooks 56 and/or slots 58 to mate the two components together.

As shown in FIGS. 1-9, the base 48 may be configured to accept and house a multimedia interface 60 through which a user may connect power cords, audio/video cables, etc. As best shown in FIG. 8, both the base upper portion 52 and the base lower portion 54 may include one or more multimedia interface openings 62 which are sized and positioned to accept the multimedia interface 60, in the form of a "jack pack" in certain embodiments. The side of the multimedia interface 60 that is inside the base 48 is configured to accept one or more cords or cables from the display device being mounted to the surface mounting system 11. The surface of the multimedia interface 60 that faces away from the base 48 also includes a plurality of ports 64 which may be configured to accept power cords, audio/video cables, etc. The multimedia interface 60 thereby permits the cables and cords from the display device to remain largely hidden from view, while also providing a convenient interface through which extension cords may be operatively connected to the cords and cables of the display device. In one embodiment, the multimedia interface 60 can be positioned on either side of the base 48. In this embodiment, if the user wishes to locate the multimedia interface 60 on the opposite side than that shown in the Figures, he or she simply places the multimedia interface 60 on the opposite side of the base lower portion 54. In the event of this action, the base upper portion 52 is rotated about 180 degrees before being secured to the base lower portion 54.

When fully installed, the lower support member 18 passes through a single hole within the desktop 100. As shown in FIGS. 8 and 9, a first surface collar 66 and a second surface collar 68 cooperate to secure the position of the lower support member 18 relative to the desktop 100. The first surface collar 66 is positioned between the base upper portion 52 and the base lower portion 54 and is sized to accept the lower support member 18. The second surface collar 68 is also sized to accept the lower support member 18 but is positioned below the desktop 100. The first and second surface collars 66 and 68 are configured to threadedly engage a series of threads 70 that are formed on a lower portion of the lower support member 18. When a user wishes to secure the lower support member 18 to the desktop 100 or other surface, the user tightens both the first surface collar 66 and the second surface collar such that the two are firmly and operatively secured against the desktop 100 on each side thereof. No screws or locking members are required to secure the first and second surface collars 66 and 68.

In addition to the first and second surface collars 66 and 68, one or more force distribution members 72 may be used to aid in distributing forces that are exerted on the desktop 100 when the surface mounting system 11 is properly installed. In one particular embodiment, the force distribution members 72 are formed from steel, but other types of metal may be used. The force distribution members 72 may also comprise certain non-metallic materials, so long as the materials are sufficiently durable so as to not fracture or otherwise break under the high forces that may be exerted against them by the first and second surface collars 66 and 68.

The force distribution members 72 serve to distribute the forces imparted by the first and second surface collars over a relatively wide area, thereby lessening the likelihood that the surface mounting system 11 may unnecessarily damage the desktop 100. In the embodiments depicted in FIGS. 8 and 9, one force distribution member 72 is positioned between the first surface collar 66 and the base lower portion 54, while a different force distribution member 72 is positioned between the second surface collar 68 and the desktop 100. In one embodiment, the force distribution members 72 are disk-shaped in order to provide for the relatively even distribution of forces on various portions of the desktop 100. However, the force distribution members 72 may possess various other shapes as well.

In addition to the force distribution members 72, the surface mounting system may also include one or more contact absorption members 74 positioned against each side of the desktop 100. In one embodiment, a contact absorption member 74 is positioned between the base lower portion 54 and the upper surface of the desktop 100, while another contact absorption member 74 is positioned between the lower surface of the desktop 100 and the second surface collar 68. In various embodiments, the contact absorption members 74 are formed from rubber or another non-abrasive material. The contact absorption members 74 are sized and configured so as to prevent at least the force distribution members 72 and a portion of the base lower portion 54 from directly contacting the desktop 100, thereby preventing these components from scratching or otherwise damaging the surfaces of the desktop. In the embodiment depicted in FIGS. 8-9, the contact absorption members 74 are disk-shaped, although the contact absorption members 74 may possess other shapes as well.

Figure 10A:
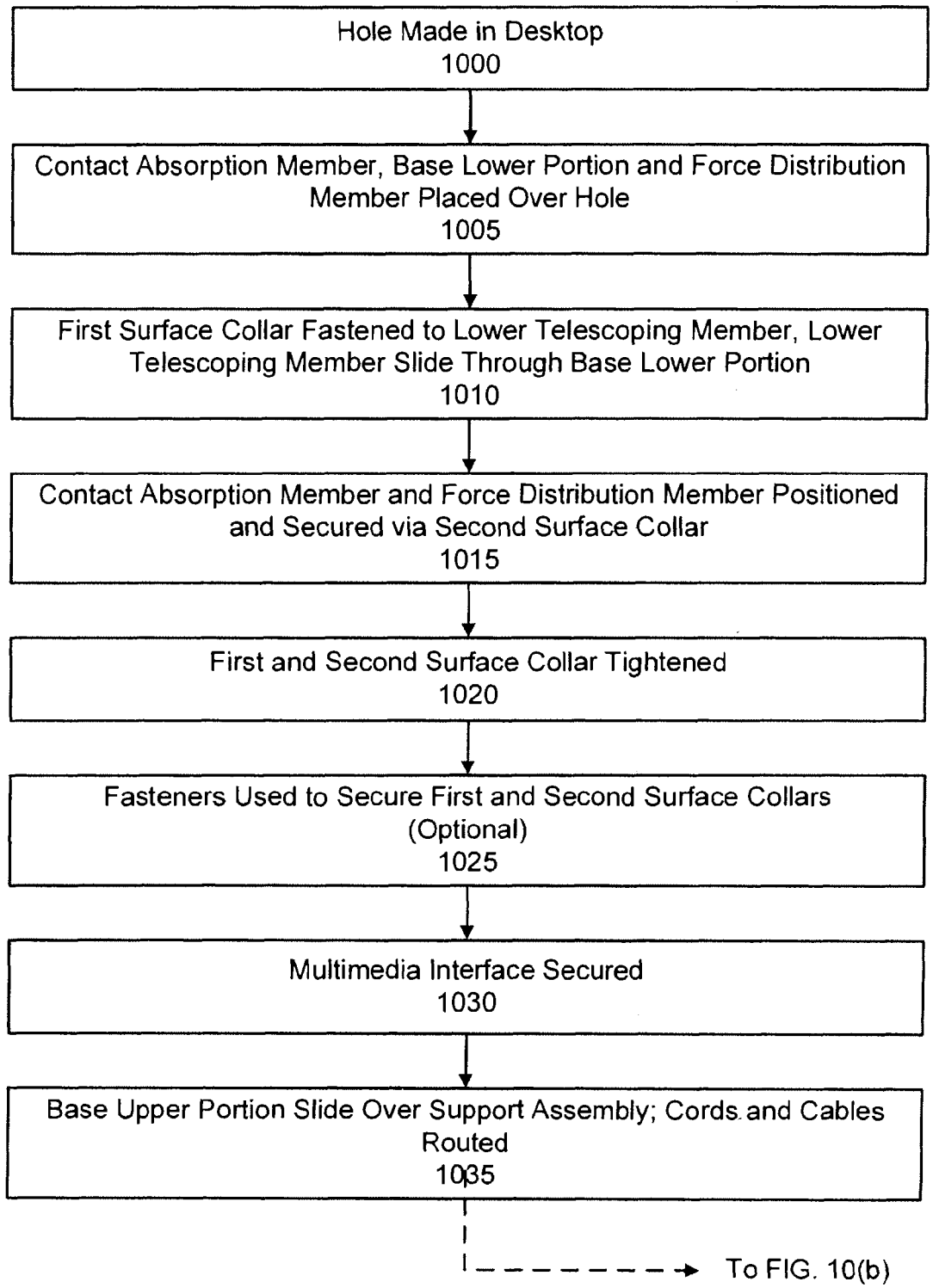
FIGS. 10(a) and 10(b) are flow charts showing a process by which the surface mounting system of FIGS. 1-9 may be installed according to various embodiments.
Figure 10B:
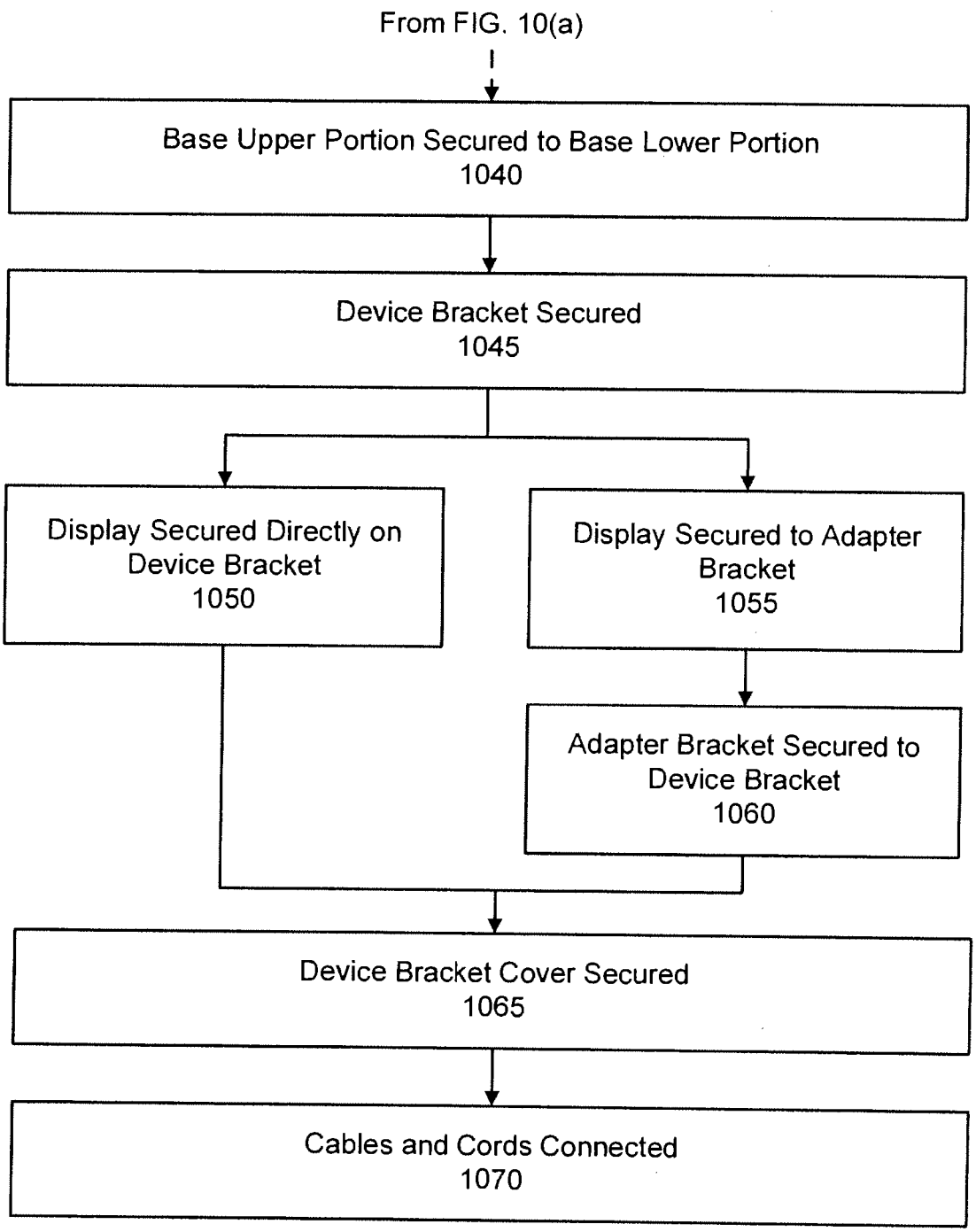

FIG. 10 is a flow chart showing a process by which the surface mounting system of FIGS. 1-9 may be installed according to various embodiments. It should be noted that several of the individual processes identified in FIG. 10 may be performed in an order that is different in the Figure. At 1000 in FIG. 10, the user makes a properly sized hole in the desktop 100 or other mounting surface (if such a hole has not already been made). At 1005, a contact absorption member 74, the base lower portion 54, and a force distribution member 72 are sequentially placed over the hole in the desktop 100, with the contact absorption member 74 on the bottom and the force distribution member 72 on the top. At 1010, the first surface collar 66 is fastened onto the threaded end of the lower support member 18 of the support assembly 12, and the support assembly 12 is slid through the base lower portion 54. At 1015, a contact absorption member 74 and a force distribution member 72 are sequentially placed on the lower support member 18 on the underside of the desktop 100 (with the contact absorption member 74 above the force distribution member 72), and these components are secured by the second surface collar 68. At 1020, the first and second surface collars 66 and 68 are tightened relative to the desktop 100. The first and second surface collars 66 and 68 may be tightened by hand, or a wrench (such as spanner wrench) may be used. Optionally at 1025, one or more screws or other fasteners may be used to more strongly secure the first and second surface collars 66 and 68 to the lower support member 18, with the screws or other fasteners engaging the threads 70 on the lower support member 18.

At 1030, the multimedia interface 60 is secured within a multimedia interface opening 62 of the base lower portion 54 via screws or other fasteners. At 1035, the base upper portion 52 is slid over the support assembly 12. At this point, individual cables or cords that extend from the back side of the multimedia interface 60 are routed through either the bottom of the lower support member 18 or through a cord acceptance opening 46. The respective cords and cables are routed out of the support assembly 12 via a cord acceptance opening 46. At 1040, the base upper portion 52 is snap fit or otherwise secured to the base lower portion 54. At 1045, the device bracket 14 is slid over the support assembly 12, and the fasteners 32 are used to secure the device bracket 14 to the upper support member 16. At this stage, other components such as needle bearings or other items that permit the device bracket 14 to rotate may also be installed.

In the event that a smaller display (such as a 32 inch display) is being secured to the mounting system, then the display is mounted directly on the device bracket 14 at 1050. If a larger display is being mounted, then the display is secured to the adapter bracket 42 at 1055, and the adapter bracket is secured to the device bracket at 1060. At 1065, the device bracket cover 44 is secured to the device bracket 14. Lastly, the various cables and cords that had been routed through the support assembly 12 may be connected to the display at 1070. Through the use of this process and others according to various embodiments, the need for a liquid locking agent to secure the surface mounting system in position is eliminated.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. For example, it is possible the surface mounting system described herein to have various security-related mechanisms included therein so as to make it more difficult for the mounting system or the attached device to be removed. The embodiments discussed herein were chosen and described in order to explain the principles and the nature of various embodiments and its practical application to enable one skilled in the art to utilize the present invention in various embodiments and with various modifications as are suited to the particular use contemplated. Various embodiments described herein are described in the general context of method steps or processes. The features of the embodiments described herein may be combined in all possible combinations of methods, apparatus, modules, systems, and computer program products.

What is claimed is:

1. A surface mounting system, comprising:
   a device bracket configured to operatively support a display device, the device bracket including an upper device opening, a lower device opening, and at least one connecting flange configured to operatively attach to the display device;
   a support assembly accepted by the upper device opening and the lower device opening and operatively connected to the device bracket, the support assembly configured to rotatably support the device bracket above a surface, the support assembly sized and configured to pass through a single hole in the surface;
   a first surface collar threadably engageable with the support assembly and configured to be positioned on a upper side of the surface; and
   a second surface collar threadably engageable with the support assembly and configured to be positioned on a lower side of the surface,
   wherein when the first surface collar is tightened against the upper side of the surface, and when the second surface collar is tightened against the lower side of the surface, the support assembly is securely mounted to the surface without the use of a locking agent, and wherein the device bracket is selectively rotatable about the support assembly to rotatably orientate the display device.

2. The surface mounting system of claim 1, further comprising:
   a base operatively connected to the support assembly and resting on the upper side of the surface; and
   a multimedia interface positioned at least partially within the base, the multimedia interface configured to accept at least one cord or cable from the display device and at least one cord or cable from a source other than the display device.

3. The surface mounting system of claim 2, wherein the base comprises a base upper portion and base lower portion, and wherein the first surface collar is positioned between the base upper portion and the base lower portion when the support assembly is securely mounted to the surface.

4. The surface mounting system of claim 2, wherein the at least one cord or cable from the display device is routable to the multimedia interface through at least a portion of the support assembly and the base.

5. The surface mounting system of claim 1, wherein the support assembly includes:
   a lower support member passing through the hole in the surface; and
   an upper support member operatively connected to the device bracket and to the lower support member.

6. The surface mounting system of claim 1, further comprising at least one force distribution member, each of the at least one force distribution member positioned between the surface and one of the first surface collar and the second surface collar.

7. The surface mounting system of claim 1, further comprising at least one contact absorption member, each of the at least one contact absorption member positioned between the surface and one of the first surface collar and the second surface collar.

8. The surface mounting system of claim 1, further comprising an adapter bracket connected to the device bracket, the adapter bracket configured to attach to the display device.

9. The surface mounting system of claim 1, further comprising a display bracket cover configured to attach to and partially surround the device bracket.

10. A surface mounting system, comprising:
    a device bracket configured to operatively support a display device;
    a support assembly operatively connected to the device bracket and configured to support the device bracket above a surface, the support assembly sized and configured to pass through a single hole in the surface;
    a first surface collar threadably engageable with the support assembly and configured to be positioned on an upper side of the surface;
    a second surface collar threadably engageable with the support assembly and configured to be positioned on a lower side of the surface; and
    at least one device collar connecting the device bracket to the support assembly, the at least one device collar passing through at least one opening in the device bracket and engaging the support assembly,
    wherein when the first surface collar is tightened against the upper side of the surface, and when the second surface collar is tightened against the lower side of the surface, the support assembly is securely mounted to the surface without the use of a locking agent.

11. A surface mounting system, comprising:
    a device bracket configured to operatively support a display device;
    a support assembly operatively connected to the device bracket and configured to support the device bracket above a surface, the support assembly sized and configured to pass through a single hole in the surface;
    a base operatively connected to the support assembly and positioned so as to contact the surface, the base including a multimedia interface configured to accept at least one cord or cable from the display device and at least one cord or cable from a source other than the display device;
    a first surface collar threadably engageable with the support assembly and configured to be positioned on an upper side of the surface;
    a second surface collar threadably engageable with the support assembly and configured to be positioned on a lower side of the surface,
    wherein when the first surface collar is tightened against the upper side of the surface, and when the second surface collar is tightened against the lower side of the surface, the support assembly is securely mounted to the surface.

12. The surface mounting system of claim 11, wherein the base comprises a base upper portion and base lower portion, and wherein the first surface collar is positioned between the base upper portion and the base lower portion when the support assembly is securely mounted to the surface.

13. The surface mounting system of claim 11, wherein the support assembly includes:
    a lower support member passing through the hole in the surface; and
    an upper support member operatively connected to the device bracket and to the lower support member.

14. The surface mounting system of claim 11, further comprising at least one force distribution member, each of the at least one force distribution member positioned between the surface and one of the first surface collar and the second surface collar.

15. The surface mounting system of claim 11, further comprising at least one contact absorption member, each of the at least one contact absorption member positioned between the surface and one of the first surface collar and the second surface collar.

16. The surface mounting system of claim 11, further comprising an adapter bracket connected to the device bracket, the adapter bracket configured to attach to the display device.

17. The surface mounting system of claim 11, further comprising a display bracket cover configured to attach to and partially surround the device bracket.

18. The surface mounting system of claim 11, wherein at least one device collar is used to connect the device bracket to the support assembly, the at least one device collar passing through at least one opening in the device bracket and engaging the support assembly.

19. The surface mounting system of claim 11, wherein the at least one cord or cable from the display device is routable to the multimedia interface through at least a portion of the support assembly and the base.

20. The surface mounting system of claim 11, wherein the device bracket is rotatable about the support assembly, and wherein the range of rotation of the device bracket about the support assembly is selectively limitable.

* * * * *